United States Patent Office 3,305,306
Patented Feb. 21, 1967

3,305,306
PROCESS OF SELECTIVELY RECOVERING METAL IONS FROM SOLUTIONS CONTAINING SAME
Hans-Georg Morawe, Mannheim-Neuostheim, and Helmut Rueckert, Mannheim-Wallstadt, Germany, and Ferdinand Furrer, Kuesnacht, Zurich, Switzerland, assignors to Joh. A. Benckiser G.m.b.H., Chemische Fabrik, Ludwigshafen (Rhine), Germany, a corporation of Germany
No Drawing. Filed Apr. 2, 1963, Ser. No. 272,502
Claims priority, application Germany, Apr. 3, 1962, B 66,649
23 Claims. (Cl. 23—97)

The present invention relates to a valuable process of recovering metal ions from metal containing solutions and more particularly to a process of recovering the metal ions from spent metal containing solutions, such as spinning solutions as used in the production of viscose fibers.

Viscose rayon is produced by first digesting wood pulp or cotton linters cellulose in sodium hydroxide solution to form alkali cellulose. After aging the alkali cellulose, cellulose xanthate is formed by reacting the alkali cellulose with carbon disulfide. The resulting xanthate is dissolved in dilute sodium hydroxide solution, the solution is ripened, filtered, and de-aerated, the xanthate spinning solution is then extruded through a multi-orifice spinneret into the regenerating bath which is usually an acid solution of metal salts. The resulting filament yarn is stretched to produce the desired orientation, washed, desulfurized, and dried. Thereby, a regenerated cellulose fiber is obtained. This viscose rayon cellulose fiber differs from native cellulose mainly by its considerably lower degree of polymerization, by its lower crystallinity, and by its unit cells being slightly altered.

Numerous processes are known for working up the spent viscose spinning baths which contain sodium ions and zinc ions in sulfuric acid solution. For instance, the zinc ions are recovered by means of ion exchange agents. According to this known process the solution containing sulfuric acid, zinc sulfate, and sodium sulfate is filtered through a strongly acid cation exchange agent of the sulfonated polystyrene resin type in its hydrogen form. Said resin exchanges the hydrogen ion against the zinc ions and the sodium ions. About 28 g. of zinc ions are recovered from one liter of such a strongly acid ion exchange agent. The zinc ions are then recovered and the ion exchange agent is regenerated by a treatment with dilute sulfuric acid or with sodium sulfate solution. As has been found, this process requires the use of 250% to 300% of regenerating agent over the stoichiometrically required amount.

It is one object of the present invention to provide a simple and highly effective process of selectively recovering metal ions from metal ion-containing solutions, such as spent viscose spinning baths. This process permits, for instance, separation of zinc and heavy metal ions from sodium ions and thus selective recovery of said zinc and heavy metal ions and is applicable to any type of waste metal ion-containing solution.

Other objects of the present invention and advantageous features thereof will become apparent as the description proceeds.

In principle the process according to the present invention consists in selectively separating heavy metal ions from other metal ions present in metal ion-containing solutions, especially in waste solutions such as spent viscose spinning baths and the like by a treatment with a weakly acid cation exchange resin, preferably a resin of the polymethacrylic acid type containing carboxyl groups as active exchange groups. Said weakly acid cation exchange resins are preferably used in their sodium form.

A suitable commercially available weakly acid cation exchange agent of this type which has proved to be especially useful for carrying out the process according to this invention is the exchange agent sold under the trademark "Duolite CS–101" by the firm Chemical Process Co. Other exchange resins of this type are the resins sold under the trademark "Amberlite IRC 50" sold by the firm Rohm and Haas Co. which are also of the acrylic acid resin type. Cation exchange agents of the phenol-formaldehyde resin type containing carboxyl groups which may also be used for the purpose of the present invention are, for instance, the exchange resins sold under the trademark "Levatit CNO" by the firm Farbenfabriken Bayer. Such exchange resins are used in their sodium form, i.e., after regeneration with stoichiometrical amounts of dilute sodium hydroxide solution or, if desired, with sodium carbonate solution. According to the process of this invention, the metal ions in the starting solutions and especially the zinc ions in spent viscose spinning baths are exchanged against the sodium ions in the exchange resin and are absorbed thereon. The sodium ions of the zinc and sodium containing sulfuric acid solutions filtered through such exchange agents pass therethrough without being chemically bound therein. If the solution to be regenerated contains other divalent or polyvalent ions in addition to the zinc and sodium ions, said bivalent and polyvalent ions are also more or less strongly bound by the exchange resin depending upon its affinity to such ions. They are thus removed from the waste spinning baths together with the zinc ions and can subsequently be separated therefrom.

It is an important advantage of the process according to the present invention that the useful capacity of such a weakly acid cation exchange agent of the type mentioned hereinabove and especially the exchange resin known as "Duolite CS–101" in its sodium form with respect to the zinc ions is between about 200% and 300% higher than that of the known strongly acid cation exchange agents of the polystyrene resin type which are sulfonated in their benzene ring. As a result thereof, it is possible to recover more concentrated metal and especially zinc solutions than obtainable according to processes used heretofore, while only a minimum amount of regenerating agent is required.

It is advisable to use in this process at least two ion exchange columns and preferably three or more columns filled with the weakly acid cation exchange resin in its sodium form whereby these columns are arranged in series.

The following examples serve to illustrate the present invention without, however, limiting the same thereto.

*Example 1*

Two exchange columns each of which is filled with 4 liters of the weakly acid cation exchange agent "Duolite CS–101" are used for carrying out the process according to the present invention. Regeneration of said cation exchange resin which commercially is available in its hydrogen form is carried out by passing sodium hydroxide solution upwardly through the column. 80 g. of sodium hydroxide per liter exchange agent are used in 3% aqueous solution whereby 5 liters to 10 liters are charged per hour and liter cation exchange agent. The water leaving the top of the column is collected and used for diluting commercial sodium hydroxide solution for subsequent regeneration. Thereafter, the converted cation exchange resin is washed briefly by passing water upwardly through the column and the water discharged from the top of the column is used for diluting the solution to be worked up.

The cation exchange columns I and II, arranged in series, are charged with a solution of the following composition: 63.5 g. of zinc per liter, 20.0 g. of sodium per liter, 0.25 g. of sulfuric acid per liter.

Said solution has a density of 1.197 and a pH value of 3.6. One part of said solution is diluted with three parts to four parts of the wash water obtained on washing the regenerated exchange column.

Said zinc and sodium containing sulfuric acid solution is passed downwardly through the cation exchange resin at a rate of 2.5 liters to 5.0 liters per hour and liter exchange resin in such an amount that half of the cation exchange resin in filter II is charged therewith. The cation exchange column I is then treated with fully demineralized water which is passed downwardly therethrough in order to replace any solution present therein towards and into column II. The cation exchange filter II is then shut off and is used in place of filter I after said filter I has been eluted and regenerated, i.e., cation exchange filter II is used as filter I while cation exchange filter I becomes filter II.

Elution of the zinc ions absorbed by cation exchange column I according to the process of the present invention is effected by passing a 20% sulfuric acid upwardly through said solumn I in an amount of 1 liter to 2.5 liters per hour and liter cation exchange resin until the solution running off from the top of said column I has a specific gravity between 1.001 and 1.002. Thereafter, the eluate still present in the exchange column and which contains most of the zinc ions, namely about 40 g. of zinc ions per liter resin, is removed from said column by passing demineralized water downwardly therethrough until the specific gravity of the eluate decreases to a specific gravity of 1.100. The following fraction of a specific gravity between 1.100 and 1.000 is separately collected and is used for diluting concentrated sulfuric acid to produce the required eluting acid. Thereafter, any acid which is still present in the filter is removed by washing.

In order to increase the zinc ion content of the eluate, it is again used for eluting the cation exchange column in the following cycle of charging and eluting in the same manner as it has been described hereinabove.

Filter I is then regenerated as described hereinabove by a treatment with sodium hydroxide solution and is arranged subsequently to filter II. Thus, the initial filter II becomes now filter I and the freshly regenerated filter I becomes filter II and the two columns are used for a subsequent recovery step.

For carrying out the second metal ion recovery process, the cation exchange filters I and II are treated with so much of the solution to be worked up that half of the new filter II is charged. Thereafter, the procedure is the same as described hereinabove and filter II is shut off. Filter I is then eluted by passing upwardly thereto the eluate of the first recovering procedure which contains already 40 g. of zinc ions per liter. In this manner the zinc ion concentration of the eluate is increased to about 75 g. to 90 g. of zinc per liter eluate and the sodium ion content is reduced from 20 g. per liter to about 1 g. per liter, calculated for the solution to be worked up. This concentrated zinc ion-containing solution is recycled for preparing new spinning baths.

Wash water obtained in this process is used for diluting the starting solution to be worked up.

The capacity of the weakly acid cation exchange resin "Duolite CS–101" is in this case between about 60 g. and about 65 g. of zinc ions per liter exchange resin.

Example 2

When regenerating the cation exchange resin "Duolite CS–101" in both filter columns by a treatment with a 3% sodium hydroxide solution in an amount of about 140 g. of sodium hydroxide per liter of resin and otherwise proceeding with the waste spinning bath of the composition given in Example 1, the capacity of the resin with respect to zinc ions is increased to 95 g. to 105 g. of zinc ions per liter resin. In this manner it is possible to produce an eluate containing about 80 g. of zinc per liter solution in a single recovery step without any reversal of the exchange columns. The eluate contains about 2 g. of sodium ions per liter.

Example 3

The procedure is essentially the same as described in Example 1 whereby, however, the commercial weakly acid cation exchange resin sold under the trademark "Levatit CNO," i.e., an exchange resin of the phenol-formaldehyde-condensation resin type, is used.

Such a cation exchange resin is regenerated by passing upwardly therethrough a 3% sodium hydroxide solution in an amount corresponding to 50 g. of sodium hydroxide per liter of exchange resin whereby 5 l. to 10 l. of said sodium hydroxide solution are passed per hour through 1 l. of said resin. The filter columns I and II are then charged with the waste spinning bath containing zinc sulfate and sodium sulfate of the above given concentration. In this manner, an eluate is obtained which contains about 65 g. to 70 g. of zinc ions per liter eluate. However, the sodium ion concentration could be reduced from 20 g. per liter to 9 g. per liter only.

The capacity of the weakly acid cation exchange resin "Levatit CNO" amounts to about 50 g. of zinc ions per liter exchange resin.

The content of zinc ions in the run-off of ion exchange filter II amounts to 2 mg. to 3 mg. per liter resin when using the weakly acid cation exchange resin "Duolite CS–101" and arranging two cation exchange columns in series. By arranging, in series, three cation exchange filters filled with "Duolite CS–101," concentrations of less than 2 mg. of zinc to none at all per liter eluate were determined. In this case, the run-off can be discharged without any further treatment into the main canal of the sewerage system.

The process according to the present invention can also be carried out by using weakly acid cation exchange resins in their alkaline earth metal form or in their potassium form, for instance, after regeneration with milk of lime or potassium hydroxide solution.

As stated above, the process according to the present invention is not limited to working up zinc and sodium containing solutions but may also be used for solutions and baths which contain, in addition to alkali metal ions or alkaline earth metal ions, copper ions, iron ions, and other heavy metal cations.

Example 4

An exchange column filled with 4 l. of the weakly acid cation exchange resin of the polymethacrylic acid type sold under the trademark "Duolite CS–101" is regenerated by a treatment with 120 g. of sodium hydroxide in 3% aqueous solution per liter ion exchange resin as described in Example 1. The ion exchange columns are then charged in the same manner as described in Example 1 with a solution containing 3.8 g. of iron sulfate per liter and 10.0 g. of sodium sulfate per liter.

Said iron and sodium containing solution is passed through the cation exchange resin at a rate of 4 l. of solution per hour per liter of resin until the ion concentration in the solution which amounts to less than 1 mg. of iron per liter during its passage through the resin, increases to more than 10 mg. of iron per liter The iron ions absorbed by the cation exchange column are eluted by means of 15% sulfuric acid in the same manner as described in Example 1. The eluate recovered on regeneration of the columns contains about 30 g. of iron ions per liter of eluate. When using the acid eluate for a second time, the iron ion concentration in the eluate can be increased to about 55 g. of iron ions per liter of eluate.

The capacity of the weakly acid cation exchange resin "Duolite CS–101" amounts in this case to about 40 g. to 45 g. of iron ions per liter of resin.

*Example 5*

Three ion exchange columns, each containing 4 l. of the weakly acid cation exchange resin "Duolite CS–101," are used in this process. The cation exchange resin which is commercially available in its hydrogen form is regenerated by a treatment with saturated lime water in an amount of 110 g. of calcium hydroxide per liter of ion exchange resin. Said lime water is passed upwardly through the resin at a rate between about 5 l. and about 10 l. per hour per liter resin. The water running off from the top of the column is collected in order to prepare the lime water used in subsequent regeneration steps. The cation exchange columns I, II, and III are charged with a solution containing about 3.2 g. of iron chloride per liter and 5.1 g. of hydrochloric acid per liter, which solution has a pH-value of about 1.05.

Said iron containing solution is passed downwardly at a rate of 10 l. per hour per liter resin through the cation exchange resin columns until the iron concentration in the run-off of the third exchange resin column exceeds 1 mg. of iron per liter resin. The cation exchange resin filter I serving as first filter is then shut off. After elution and regeneration it is arranged in such a manner that it follows initial filter III and cation exchange resin filter II becomes filter I.

Elution of the iron ions absorbed by cation exchange resin column I is effected by passing upwardly therethrough 30% hydrochloric acid in the same manner as described in Example 1. The eluate is used subsequently in several successive recovering steps as eluting solution by passing it upwardly through the ion exchange resin columns in order to increase the iron, ion content therein. In this manner the iron content of the eluate can be increased up to 170 g. of iron ions per liter of eluate while its content of free acid can be kept below 20 g. to 50 g. of hydrochloric acid per liter eluate and its calcium ion content below 2 g. of calcium ions per liter of eluate. The capacity of the weakly acid cation exchange resin "Duolite CS–101" amounts in this case to about 28 g. to 37 g. of iron ions per liter of resin.

*Example 6*

An exchange column filed with 4 l. of the weakly acid cation exchange resin "Duolite CS–101" is regenerated by a treatment with lime water as described in Example 4. Thereafter, it is charged with a solution of the following composition: 0.19 g. of copper per liter and 3.31 g. of nitric acid per liter.

Such a solution is passed through the cation exchange resin at a rate of 7 l. per hour per liter resin until the copper concentration in the run-off exceeds 1 mg. of copper per liter and the pH-value of the run-off is decreased below a pH of 7.0, indicating that the ion absorbing capacity of the ion exchange resin is exhausted. The copper ions absorbed by the cation exchange column are eluted by passing 20% sulfuric acid therethrough as described in Example 1. The eluate recovered on regeneration contains about 5 g. of copper ions per liter of eluate dissolved therein after a single passage of the starting solution through the column. When using the eluting acid solution five times, the copper concentration in the eluate can be increased to about 20 g. of copper ions per liter of eluate.

In this case, the capacity of the weakly acid cation exchange resin "Duolite CS–101" amounts to about 6 g. of copper ions per liter of resin.

According to a valuable further embodiment of the present invention metal ion containing solutions of a high acid concentration are preferably neutralized by means of sodium hydroxide or sodium carbonate solutions, lime milk, or other neutralizing agents, before passing the same through the ion exchange columns. Such a preliminary neutralization, however, is not necessary for proper operation.

The process according to the present invention as described hereinabove is, of course, not limited to working up mineral acid solutions such as hydrochloric acid, sulfuric acid, or phosphoric acid solutions. It can likewise be used for working up solutions of organic acids and of neutral or alkaline solutions in order to selectively recover heavy metal ions therefrom.

Of course, many changes and variations in the weakly acid ion exchange agents and resins, in the regenerating agents and their solutions and concentrations, in the eluting agents and their concentrations, in the metal ion containing solutions to be used as starting materials in this process, in the number of ion exchange columns employed and their arrangement, in the process of working up the eluate and waste liquors obtained thereby, and the like, may be made by those skilled in this art in accordance with the principles set forth herein and in the claims annexed hereto.

We claim:

1. A process of recovering zinc and heavy metal cations from solutions containing such cations, said process comprising the steps
   (1) of passing a solution containing zinc and heavy metal cations through a weakly acid cation exchange agent, the hydrogen atoms of its acid groups being replaced by metal atoms selected from the group consisting of alkali metal atoms and alkaline earth metal atoms, until the concentration of zinc and heavy metal cations in the effluent of the cation exchange agent increases, and thereafter
   (2) of passing an acid solution through the cation exchange agent to elute therefrom the absorbed zinc and heavy metal ions, so as to regenerate the cation exchange agent and to recover zinc and heavy metal from the resulting acid eluate.

2. The process according to claim 1, wherein the weakly acid cation exchange agent is a weakly acid cation exchange resin having exchange-active carboxyl groups.

3. The process according to claim 1, wherein the weakly acid cation exchange agent is a weakly acid cation exchange resin in its alkali metal form.

4. The process according to claim 1, wherein the weakly acid cation exchange agent is a weakly acid cation exchange resin in its alkaline earth metal form.

5. The process according to claim 1, wherein the weakly acid cation exchange agent is a weakly acid cation exchange resin of the polymethacrylic acid resin-type having carboxyl groups as exchange-active groups.

6. The process according to claim 5, wherein the weakly acid cation exchange agent is a weakly acid cation exchange resin of the polymethacrylic acid resin-type in its alkali metal form.

7. The process according to claim 5, wherein the weakly acid cation exchange agent is a weakly acid cation exchange resin of the polymethacrylic acid resin-type in its alkaline earth metal form.

8. The process according to claim 1, wherein the weakly acid cation exchange agent is a weakly acid cation exchange resin of the polycondensation resin-type having carboxyl groups as exchange-active groups.

9. The process according to claim 8, wherein the weakly acid cation exchange agent is a weakly acid cation exchange resin of the polycondensation resin-type in its alkali metal form.

10. The process according to claim 8, wherein the weakly acid cation exchange agent is a weakly acid cation exchange resin of the polycondensation resin-type in its alkaline earth metal form.

11. A process of recovering zinc cations from spent viscose spinning baths, said process comprising the steps
    (1) of passing the spent viscose spinning bath through a weakly acid cation exchange agent in its sodium form until the zinc ion concentration in the effluent from the cation exchange agent increases, and thereafter (2) of passing a dilute sulfuric acid solution therethrough to elute therefrom the absorbed zinc ions so as to regenerate the cation exchange agent and to recover zinc from the resulting sulfuric acid eluate.

12. The process according to claim 11, wherein the weakly acid cation exchange agent is a weakly acid cation exchange resin having exchange-active carboxyl groups.

13. The process according to claim 11, wherein the weakly acid cation exchange agent is a weakly acid cation exchange resin of the polymethacrylic acid resin-type having carboxyl groups as exchange-active groups.

14. The process according to claim 11, wherein the weakly acid cation exchange agent is a weakly acid cation exchange resin of the polycondensation resin-type having carboxyl groups as exchange-active groups.

15. A process of recovering zinc and heavy metal cations from solutions containing such ions and also alkali metal and alkaline earth metal ions, said process comprising the steps (1) of passing a solution containing said zinc, heavy metal, alkali metal, and alkaline earth metal cations through a weakly acid cation exchange resin having exchange-active carboxyl groups, the hydrogen ions of its carboxyl groups being replaced by metal ions selected from the groups consisting of alkali metal ions and alkaline earth metal ions, until the concentration of zinc and heavy metal ions in the effluent of the weakly acid cation exchange resin increases, so as to selectively exchange the zinc and heavy metal ions of the starting solution against the alkali metal and alkaline earth metal ions of the weakly acid cation exchange resin, thereafter (2) of passing an acid solution through the cation exchange resin to elute therefrom the zinc and heavy metal ions absorbed by said cation exchange agent and to reconstitute the carboxyl groups of the weakly acid cation exchange agent, and thereupon (3) of passing a solution containing metal ions selected from the group consisting of alkali metal ions and alkaline earth metal ions through the acid-treated cation exchange resin so as to replace the hydrogen ions of its carboxyl groups by said metal ions selected from the group consisting of alkali metal ions and alkaline earth metal ions and to regenerate the cation exchange resin for renewed recovery of zinc and heavy metal ions from solutions containing such ions.

16. A process of recovering heavy metal cations from solutions containing such heavy metal cations, said process comprising the steps (1) of passing such solutions through a weakly acid cation exchange resin in its alkali metal form until the heavy metal ion concentration in the effluent from the cation exchange resin increases, and (2) of passing a dilute mineral acid therethrough to selectively elute the absorbed heavy metal ions from the cation exchange resin.

17. The process according to claim 16, wherein the heavy metal cations present in the starting solution are iron ions.

18. The process according to claim 16, wherein the heavy metal cations present in the starting solution are copper ions.

19. The process according to claim 16, wherein the dilute mineral acid eluting solution is a dilute sulfuric acid solution.

20. The process according to claim 16, wherein the dilute mineral acid eluting solution is a dilute hydrochloric acid solution.

21. A process of recovering zinc and heavy metal cations from solutions containing same as well as alkali metal and alkaline earth metal ions, said process comprising the steps (1) of passing said solutions through a weakly acid cation exchange agent, the hydrogen atoms of its acid groups being replaced by metal atoms selected from the group consisting of alkali metal atoms and alkaline earth metal atoms, until the zinc and heavy metal ion concentration in the effluent from the cation exchange agent increases, and (2) of passing an acid solution through said cation exchange agent having absorbed thereon the zinc and heavy metal ions to selectively elute said zinc and heavy metal ions therefrom.

22. The process according to claim 21, wherein the weakly acid cation exchange agent is a weakly acid cation exchange resin of the polymethacrylic acid resin-type having carboxyl groups as exchange-active groups.

23. The process according to claim 21, wherein the weakly acid cation exchange agent is a weakly acid cation exchange resin of the polycondensation resin-type having carboxyl groups as exchange-active groups.

References Cited by the Examiner

UNITED STATES PATENTS 2,628,165  2/1953  Bliss _____ 210—38 X
3,216,786  11/1965 Corte et al. _____ 23—125 X

OTHER REFERENCES

Helfferich: "Ion Exchange," © 1962, by McGraw-Hill Book Co., Inc., p. 16 relied upon.

MORRIS O. WOLK, *Primary Examiner.*

E. G. WHITBY, *Assistant Examiner.*